United States Patent
Ross et al.

(10) Patent No.: US 11,625,618 B1
(45) Date of Patent: *Apr. 11, 2023

(54) PROCESSOR COMPILER

(71) Applicant: Groq, Inc., Mountain View, CA (US)

(72) Inventors: Jonathan Alexander Ross, Palo Alto, CA (US); Gregory M. Thorson, Palo Alto, CA (US)

(73) Assignee: Groq, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/528,609

(22) Filed: Nov. 17, 2021

Related U.S. Application Data

(63) Continuation of application No. 16/526,916, filed on Jul. 30, 2019, now Pat. No. 11,210,594, which is a continuation of application No. 16/132,102, filed on Sep. 14, 2018, now Pat. No. 11,170,307.

(60) Provisional application No. 62/561,516, filed on Sep. 21, 2017.

(51) Int. Cl.
*G06N 5/022* (2023.01)
*G06N 20/00* (2019.01)

(52) U.S. Cl.
CPC ............. *G06N 5/022* (2013.01); *G06N 20/00* (2019.01)

(58) Field of Classification Search
CPC ...... G06N 5/022; G06N 20/00; G06N 3/0445; G06N 3/0454; G06Q 10/04
See application file for complete search history.

(56) References Cited

U.S. PATENT DOCUMENTS

| | | | |
|---|---|---|---|
| 7,640,528 B1 | 12/2009 | Baeckler | |
| 8,370,280 B1 * | 2/2013 | Lin | G06N 5/04 706/12 |
| 8,689,202 B1 | 4/2014 | Braun et al. | |
| 9,691,019 B1 | 6/2017 | Gulland et al. | |
| 9,697,463 B2 | 7/2017 | Ross et al. | |
| 9,710,748 B2 | 7/2017 | Ross et al. | |
| 2006/0225061 A1 * | 10/2006 | Ludwig | G06F 8/441 717/161 |
| 2008/0209181 A1 | 8/2008 | Petkov et al. | |
| 2013/0212277 A1 * | 8/2013 | Bodik | G06F 9/4887 709/226 |
| 2018/0198730 A1 * | 7/2018 | Cook | H04L 65/60 |

OTHER PUBLICATIONS

United States Office Action, U.S. Appl. No. 16/526,936, filed Jul. 1, 2022, 12 pages.

* cited by examiner

*Primary Examiner* — Jonathan Han
(74) *Attorney, Agent, or Firm* — Fenwick & West LLP

(57) ABSTRACT

A system receives a predictive model and receives one or more runtime constraints. The system generates a directed acyclic graph (DAG) of the predictive model indicating dependencies. The system compiles the predictive model into first instructions for a first processor based on the one or more runtime constraints and the DAG. The system packages first instructions, the one or more runtime constraints, and the DAG of the predictive model in a first binary. The system recompiles the predictive model into second instructions for a second processor based on the runtime constraints and the DAG stored in the first processor. The system packages the second instructions, the DAG, and the runtime constraints in a second binary.

20 Claims, 9 Drawing Sheets

700

```
> compile -o:{throughput, latency,
energy, memory} resnet152.model
=== SUCCESS ==============
  throughput optimized:
    IPS: 3,212.3
    duration: 817.9µs
    peak-memory: 59.1MiB
    energy: 4.83870967 millijoules
  latency optimized:
    IPS: 2,702.1
    duration: 134.1µs
    peak-memory: 36.7MiB
    energy: 5.76923076 millijoules
  energy optimized:
    IPS: 1,699.4
    duration: 213.1µs
    peak-memory: 32.1MiB
    energy: 4.687581911 millijoules
  memory optimized:
    IPS: 2,544.1
    duration: 142.3µs
    peak-memory: 27.2MiB
    energy: 5.08064516  millijoules
==========================
```

FIG. 7

PROCESSOR COMPILER

CROSS-REFERENCE TO RELATED APPLICATIONS

This application is a continuation of co-pending U.S. application Ser. No. 16/526,916 filed Jul. 30, 2019, which is a continuation of U.S. application Ser. No. 16/132,102, filed Sep. 14, 2018, now bearing U.S. Pat. No. 11,170,307, which claims the benefit of U.S. Provisional Application No. 62/561,516, filed Sep. 21, 2017, all of which are hereby incorporated by reference in their entirety.

TECHNICAL FIELD

The disclosure generally relates to compilers for special purpose processors, such as a predictive model compiler for generating statically scheduled binary with known resource constraints.

BACKGROUND

Machine learning model applications are being used in a large number of applications that require fast, e.g., real time, processing time for the output of the machine learning model. Furthermore, in many of these applications, the machine learning model may be configured within an embedded device with strict power maximums and/or other constraints. However, current means of implementing machine learning models neither guarantee time nor power constraints. For example, graphics processing units are commonly used to execute machine learning models. However, if used in an embedded system, such as within a car for self-driving applications, such a GPU may not necessarily return results within the specified time constraints needed for the real-time operation of the system, and furthermore may occasionally or often generate peak power draws that exceed the platform capabilities of the vehicle and which may also exceed the temperature dissipation capabilities of the device. Hence, an improved system for execution of machine learning models is desired.

BRIEF DESCRIPTION OF THE DRAWINGS

The disclosed embodiments have advantages and features which will be more readily apparent from the detailed description and the accompanying figures. A brief introduction of the figures is below.

Figure (FIG.) 1 illustrates a system for optimized compilation of predictive models, according to an embodiment.

FIG. 7 illustrates an example of a report of constraint metadata for a compiled binary as reported by the compiler, according to an embodiment.

DETAILED DESCRIPTION

Figure 1:
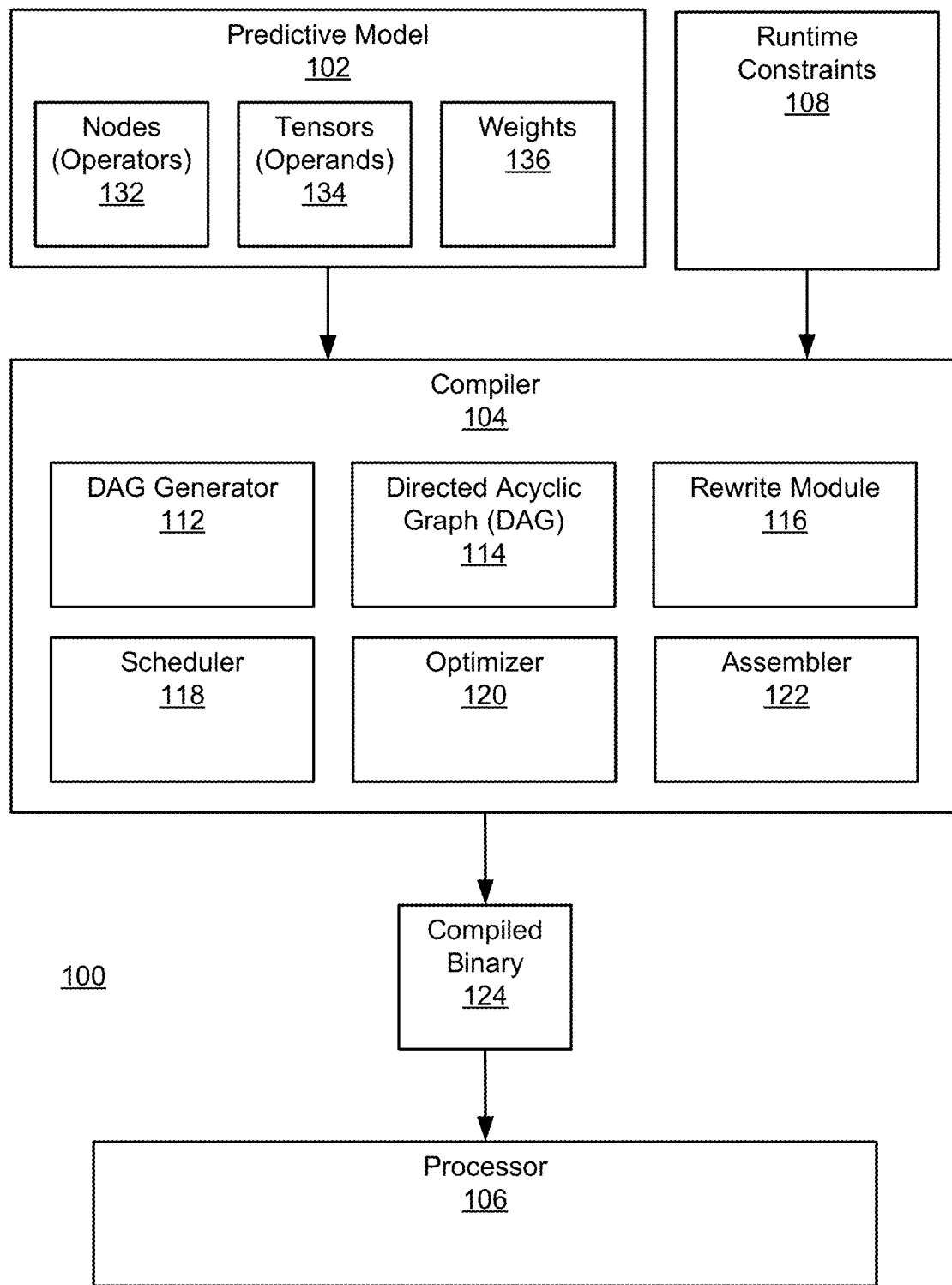

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One or more embodiments disclosed herein relate to optimized compilation of machine learning models such as TensorFlow models. The model is fed into a compiler, which in one embodiment, generates a directed acyclic graph (DAG) of the model, rewrites the operators in the model into special purpose hardware instructions, schedules the hardware instructions down to each clock cycle, optimizes the instructions within desired runtime constraints, and assembles the scheduled instructions with constraint metadata in a binary that can be delivered to a special purpose processor that executes the instructions within the binary. The processor executes the instructions to process data inputs for the machine learning model, and generates output corresponding to the output of the predictive model. Furthermore, the execution of the model in the processor results in performance that conforms to the stated constraints indicated in the constraint metadata. These constraints may include time to run, power used, memory used, heat generated, and so on. This allows a designer or other user to include the processor with compiled binary as a component in a larger device knowing that the processing of the machine model will always be within the stated constraints and not exceed them.

Exemplary System

Figure (FIG.) 1 illustrates a system 100 for optimized compilation of predictive models, according to an embodiment. The system 100 includes a predictive model 102 and runtime constraints 108 which are input into the compiler 104. The compiler 104 outputs a compiled binary 124 which is input into the processor 106 which executes the compiled binary. Each of these components, and their sub-components (if any) are described in greater detail below. Although a particular configuration of components is described herein, in other embodiments the system 100 may have different components and these components may perform the functions of the system 100 in a different order or using a different mechanism.

The predictive model 102 encompasses any models that can process input data and make a prediction from the input data. Examples of predictions can be category classifications made with a classifier, or predictions of values. As shown, the predictive model 102 describes a machine learning model and may include nodes 132, tensors 134, and weights 136 (also referred to as model coefficients). In one embodiment the predictive model is a TensorFlow model, the compiler 104 is a TensorFlow compiler and the processor 106 is a tensor stream processor.

The nodes 132 in the predictive model 102 represent operators. These operators may be arithmetic operators, matrix transformation operators, Boolean operators, and other operators which take one or more inputs and generate a single output (i.e., functions), including any operators used within a machine learning model on input data. Further examples of specific operators may include multiplication, division, convolution, projection, matrix multiplication, and so on.

The tensors 134 in the predictive model 102 represent operands, i.e., the values that the operators modify. These tensors 134 may include scalar values, vector values, and matrix values. The values may be represented in integer or floating point format. For example, the tensors 134 may be tensors themselves, which describe relationships between different scalar values, vectors, and other tensors. Tensors may be represented as matrices and stored as multidimensional arrays, within a database, as a flat file, etc. Note that the tensors 134 may themselves be outputs from other nodes 132.

The weights 136 are values that are generated and stored in the predictive model 102 after the predictive model 102 is trained, and represent the relative strengths or impact of a particular node 132 or tensor 134 in the predictive model 102. As noted, the nodes 132 operate on tensors 134. Each of these nodes 132 and/or tensors 134 may have an associated weight 136. When computing the output of each node 132, any associated weights 136 are used to modify their respective tensors 134 or the output of a node 132, and this modified value is passed on to the subsequent nodes 132 (or is the final output). The weights 136 are generated after training the predictive model 102. As noted, the predictive model 102 accepts inputs and generates an output that has some relation to the inputs. For example, an input could be an image, and the output may indicate that a value beyond a threshold minimum which identifies the type of an object in the image. During training, the predictive model 102 is trained using a training set of data. This training set includes similar inputs as would be fed to the predictive model 102 during use, but these inputs of the training set are associated with known output labels, which represent the correct output that the predictive model 102 should generate once trained. Furthermore, the weights 136 for the untrained predictive model 102 are initialized to random and/or default values. Following the input of each set of input data in the training data, the predictive model 102 under training generates a set of output values. These are compared to the known output labels for the input data. The weights 136 are iteratively adjusted (e.g., via gradient descent) over multiple passes of different input data in the training set until the predictive model 102 can reliability generate outputs that correctly predict the known corresponding output labels for the input data. After this iterative process, the weights 136 are stored with the predictive model 102 for use with new data.

The runtime constraints 108 define various limits for the execution of the predictive model 102, as executed on the processor 106 after the predictive model 102 is compiled using the compiler 104. The runtime constraints 108 may be referred to as target constraints. These runtime constraints 108 may be provided by a vendor, user, or other entity that plans to use the predictive model 102. The runtime constraints 108 may include execution time constraints, power usage constraints, thermal constraints (from execution of the model), hardware use constraints, hardware version constraints, and other characteristics of the execution. These constraints may be defined using any type of measurement, and can be a relative measure or a direct value. For example, the execution time constraint may be defined according to time or clock cycles. As another example, the power usage constraints may be defined by total joules, power use per unit time, average power use per unit time, and so on. As another example, the thermal constraints may be defined as total watts dissipated, or by a percentage of the maximum thermal heatsink dissipation available to a particular configuration of a processor 106. As another example, the hardware use constraints may constrain the execution of the predictive model 106 to use only a certain number or percentage of the hardware resources, such as various functional units in the processor 106, or memory or cache in the processor 106. After receiving these runtime constraints 108, in one embodiment, the compiler 104 attempts to generate a compiled binary 124 that meets (or falls within) these runtime constraints 108. However, in other embodiments, the compiler 104 does not receive a set of runtime constraints 108. Instead, as described with further detail below, the compiler 104 is instructed to compile different versions of binaries that each optimize for one or more different constraints.

The compiler 104 compiles the predictive model 102 into a compiled binary 124 for execution on the specialized processor 106 and which also meets the runtime constraints 108. The compiler 104 includes a directed acyclic graph (DAG) generator 112, the DAG 114 generated by the DAG generator 112, a rewrite module 116, a scheduler 118, a constraint optimizer 120, and an assembler 122.

The DAG generator 112 generates the DAG 114. A DAG, or directed acyclic graph, is a finite directed graph with no directed cycles (i.e., loops). The DAG generator 112 may take the predictive model 102 and the nodes 132 and tensors 134 of the predictive model and generate the DAG 114, which represents all the dependencies between the outputs of nodes and the inputs to other nodes in the predictive model 102. Each vertex (e.g., node) in the DAG 114 may represent an operand of the predictive model 102, and each edge in the DAG may represent an operator of the predictive model 102. Alternatively, each operand and each operator may each be represented by a separate vertex in the DAG 114. In this second case, some vertices in the DAG 114 represent operands, and some represent an operator as well as its output. As the operands of some operators are themselves outputs from other operators, the DAG 114 shows the relationship between these various operands and operators in the predictive model 102.

To generate the DAG 114, the DAG generator 112 may parse through the different nodes 132 and tensors 134 of the predictive model 102. The DAG generator 112 may begin by assigning vertices to the inputs of the predictive model 102. These inputs feed into nodes 132 of the predictive model, and these nodes are assigned their own vertices in the DAG 114 by the DAG generator 112. The outputs of these nodes may be tensors 134 that feed into other nodes, and so the DAG generator 112 may indicate this by directing the vertices of these nodes into other vertices representing the other nodes. This continues until the entire predictive model 102 is parsed by the DAG generator 112. This process may run in linear time. An illustration of an exemplary DAG is provided in FIG. 6, along with a related description provided below.

The rewrite module 116 of the compiler 104 "rewrites" or translates the operators in the generated DAG 114 into translated instructions, which are machine instructions that can be executed by the processor 106 hardware. As used here, the machine instructions refer to the machine code or language that can be directly executed in the hardware, which in this case is the processor 106. The number of machine instructions supported by the processor 106 may be relatively small compared to other architectures, and thus certain operators may need to be translated into a set of translated instructions as the original operator may not be supported by a hardware instruction in the hardware of the processor 106. The supported machine instructions may support SIMD (single instruction multiple data). For each node 132 of the predictive model 102 indicating an operator, the rewrite module 116 may translate (i.e., convert) this operator into a set of supported machine instructions (e.g., micro ops). Some operators may be translated into single machine instructions, while other (possibly more complicated operators) may be translated into multiple machine instructions. For example, an add operator may be translated into a single machine instruction, but a matrix operator (e.g., convolution) may be translated into multiple machine instructions. The rewrite module 116 may store the translated instructions separately and/or within the DAG 114 along with their respective operators in the corresponding vertices.

The scheduler 118 orders, distributes, and sets the execution timing of the translated instructions from the rewrite module 116 such that the translated instructions are set to execute on a predetermined component group or component type of the processor 106, in a specific execution order, and at a specific clock cycle. The scheduler 118 accesses the DAG 114 and determines an optimal execution order for each of the translated instructions associated with the various vertices in the DAG 114. As noted, these translated instructions correspond to nodes of the predictive model 102. The optimal execution order may ensure that instructions are only executed when they are needed and minimizes any time spent blocking on operands that have not yet been computed. Additional details regarding the scheduler 118 are provided below with reference to FIG. 2.

In one embodiment, the compiler 104 includes a constraint optimizer 120 to optimize the scheduled instructions generated by the scheduler 118 according to the runtime constraints 108. For example, where the runtime constraint 108 is a power constraint, the constraint optimizer 120 may defer a set of instructions from execution to ensure that the power constraint is met. Note that the constraint optimizer 120 has knowledge of the entire execution path of the set of scheduled instructions because the scheduled instructions are statically scheduled per clock cycle and component of the processor 106. The instructions do not contain any unknown branching paths or other steps that would create ambiguity as to how the execution of the instructions is to proceed. Due to this knowledge, the constraint optimizer 120 can modify the scheduled instructions such that the execution of these instructions by the processor 106 fits within the runtime constraints 108. This modification of the scheduled instructions may include rescheduling the instructions, deferring execution of instructions, and so on. Furthermore, after optimizing the instructions, the constraint optimizer 120 can also determine the actual constraints that the optimized instructions fall under, as these may be different and/or be better than the runtime constraints 108 that are provided. The constraint optimizer 120 can determine the constraints of the instructions, because, as noted, the constraint optimizer 120 has a complete view (i.e., a "god" view) of the statically scheduled instructions that are to be executed. Additional details regarding the constraint optimizer 120 are provided below with reference to FIG. 3.

The assembler 122 performs the final compilation and packaging of the scheduled instructions to generate the compiled binary 124. The assembler 122 may map the scheduled instructions for the particular hardware version of the processor 106 that is being used, and determine the exact component queue to place each instruction into. The assembler 122 may also package the DAG 114 in encrypted format, as well as the actual constraints as constraint metadata for the final set of assembled instructions as generated by the scheduler 118 within the binary. This allows a user of the compiled binary 124 to know the expected constraints when the compiled binary 124 is executed on the processor 106, and also allows the compiled binary 124 to be re-assembled or re-compiled using the encrypted DAG in the event of a hardware version upgrade of the processor 106 which causes incompatibility with the machine instructions in the compiled binary 124. Additional details regarding the assembler 122 are provided below with reference to FIG. 4.

The processor 106 can be a special purpose hardware device that can accept a non-standard instruction set for processing predictive models such as the predictive model 102. After the predictive model 102 is compiled into the compiled binary 124 by the compiler 104 as described above, the compiled binary 124 can be transmitted or loaded onto the processor 106, which executes the machine instructions included in the compiled binary 124. The processor 106 may include one or more various matrix arithmetic blocks, numerical conversion blocks, vector computation blocks, memories, data permutation blocks, as well as input/output buses. These various functional units may be clocked with a single clock, or using different clocks. As noted, the compiled binary 124 has the unique characteristic of being generated with instructions that are predetermined for loading on specific blocks (i.e., functional units) of the processor 106, and at specific clock cycles. Thus, the execution of the compiled binary 124 by the processor 106 is also guaranteed to meet the constraint metadata generated by the compiler 104 for the predictive model 102.

This is in contrast with traditional execution of machine learning models, which do not meet guaranteed runtimes, power envelopes, resource utilization, and other constraints, as previously these machine learning models were executed similar to the execution of traditional code (e.g., x86 code) on a general purpose machine. This is disadvantageous for mission critical systems which require highly accurate information about resource utilization and which may also require per-clock timing and accuracy. For example, if the machine learning model is used in an embedded device in a real time application, then any extraneous delays would not be acceptable. Such applications typically have many other constraints which need to be met and which traditional means of executing machine learning models do not meet. Such application may include self-driving cars, vehicle guidance systems, medical operations devices, and so on. The execution of the machine learning model on the system described herein can allow for the execution to be guaranteed to meet these various constraints and requirements, thus bringing the power of machine learning and artificial intelligence (AI) based technologies to these mission critical applications.

Additionally, as the compiler 104 translates the sometimes complex operators in the predictive model 102 into machine instructions that are capable of being processed using the reduced instruction set supported by the processor 106, this allows for the processor 106 to be designed with less decode logic and other components typically needed to support a large instruction set. This can further speed up the executions and increase the instructions per cycle for the processor 106 as its pipeline is heavily optimized due to the lack of a complex set of instructions that need to be supported.

Furthermore, due to the predetermined per-clock execution granularity (i.e., the statistically scheduled execution) of the instructions as scheduled by the compiler 104, the processor 106 does not necessarily need to include hardware blocks that in traditional systems are used to deal with branch misses, cache misses, and so on. This additional hardware, which may include branch prediction blocks, synchronization logic (or code), cache miss logic, out of order execution logic, and so on, is resource intensive to implement and execute in hardware and can eat into the silicon budget of the device. As the compiler 104 has scheduled the machine instructions with a fixed order, this additional logic is not necessary, allowing the hardware blocks of the processor 106 to be further maximized for optimal performance and execution of the smaller number of specialized machine instructions supported by the processor 106. Additional details regarding the processor 106 are provided below with reference to FIG. 5.

Example Scheduler

Figure 2:
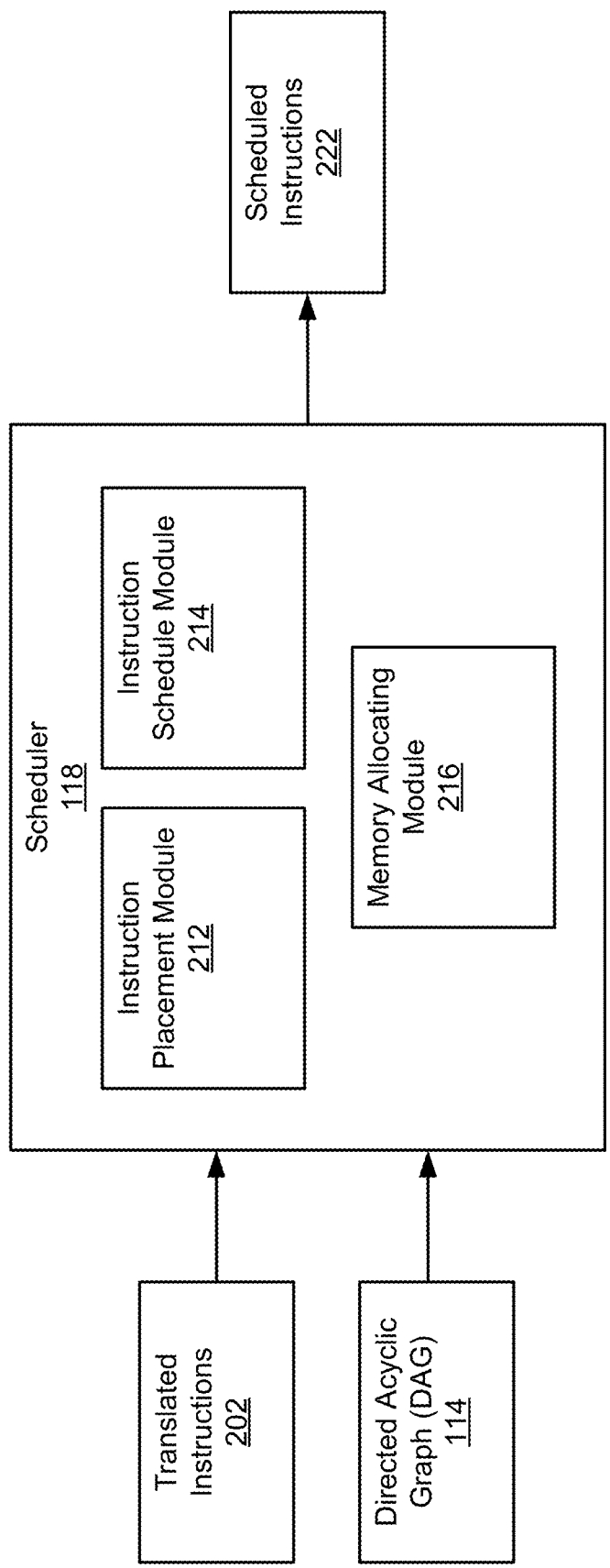
FIG. 2 illustrates a detailed block diagram of the scheduler, according to an embodiment.

FIG. 2 illustrates a detailed block diagram of the scheduler 118, according to an embodiment. The scheduler 118, as noted, may schedule the instructions in a particular order, with a particular clock cycle timing, and amongst a particular set of components of the hardware. As illustrated, the scheduler 118 includes an instruction placement module 212, instruction schedule module 214, and a memory allocating module 216. Although a particular set of modules is illustrated here, in other embodiments the number, type, and/or function of the modules of the scheduler 118 are different.

The instruction placement module 212 orders the translated instructions 202 received from the rewrite module 116 in an optimal condition. This optimal condition is achieved when instructions are ordered such that any delay (i.e., latency) caused by dependencies between instructions is minimized. These dependencies are indicated in the DAG 114. For example, an add instruction depends upon the readiness of the operands of the add instruction. Thus, an ideal ordering of the add instruction is to have it ordered after the instructions that generate output that are used as the operands of the add instruction. If the add instruction is ordered before the instructions that generate the operands of the add instruction, then during execution, the processor 106 must block (i.e., wait) on the execution of the other instructions, receive the operands which are the outputs of these instructions, and then execute the add instruction. This causes delay. The instruction placement module 212 may use many different types of methods to order the translated instructions 202, such as using a SAT instance solver (i.e., a Propositional Satisfiability Problem Solver) to determine an ideal ordering of the translated instructions, or using a greedy algorithm, or any other method that may be used to minimize the delay to reach the optimal condition.

The instruction schedule module 214 determines a timing or relative clock cycle for the execution of each translated instruction 202. In one embodiment, the process completed by the instruction schedule module 214 may be completed in tandem with the instruction placement module 212 or as part of the ordering process performed by the instruction placement module 212. As different instructions execute for different numbers of clock cycles, due to the parallel execution of the instructions by the processor 106, simply executing the instructions as fast as possible may create situations where instructions are executed out of the correct order as determined by the instruction placement module 212. For example, an add instruction may have operands that depend on two multiply instructions. However, these instructions execute in parallel. Thus, the add instruction may need to be executed after a delay so that the execution of the multiply instructions are completed and the outputs of the multiply instructions are stored in memory (for access by the add instruction).

In one embodiment, to determine how long to delay various instructions, the instruction schedule module 214 may determine for each instruction under analysis, how many clock cycles are needed for the execution of other instructions that the instruction under analysis depends upon. The instruction schedule module 214 determines, according to the ordering of the instructions as ordered by the instruction placement module 212, if the number of clock cycles that transpire between the (start of) execution of the other instructions and the execution of the instruction under analysis exceeds the needed clock cycles. If so, then the instruction schedule module 214 does not add a delay to the execution of the instruction under analysis. However, in the other case, the instruction schedule module 214 adds a delay to the execution of the instruction under analysis that is at least a number of clock cycles equal to the difference between the needed clock cycles and the number of clock cycles that transpire. The instruction schedule module 214 may store an indication of this delay with the instruction under analysis, or with an instruction directly preceding the instruction under analysis. Although this exemplary method of assigning delays is shown, alternative methods may be used to determine the delay for an instruction to ensure that other instructions on which the instruction depends upon are executed before the instruction is executed.

Note that the delay value, or count field, that is indicated with the instruction represents a number of clock cycles. In practice, this delay may be substituted with one or more NOP (no operation) instructions. Additionally, the delay is in relative terms (e.g., +5 clock cycles) rather than absolute terms (e.g., delay till clock cycle 2038) to avoid issues for loops. As loops may require the same instructions to be executed multiple times, having an absolute delay value would cause the delay value to become inaccurate after a single execution of the loop.

As noted previously, the execution of the instructions in the processor 106 is statically scheduled, and thus instructions run in lockstep without deviation or branching. Thus, the delay values that are assigned to the instructions ensure the correct execution of the instructions in this lockstep process.

The memory allocating module 216 determines on which hardware component to execute each translated instruction 202 or a group of translated instructions 202. The translated instructions 202 may execute on more than one processor 106. In such a case, the memory allocating module 216 may determine on which one of the processors 106 to execute an instruction. Furthermore, a processor 106 may be paired with a general purpose CPU (central processing unit), GPU (graphics processing unit) or other component. In such a case, the memory allocating module 216 may determine on which one of these other non-processors to execute any of the translated instructions 202 and/or operands from the predictive model 102, in lieu of having the processor 106 execute the instruction.

In the case of multiple processors 106, the memory allocating module 216 may determine which processor 106 to execute a translated instruction 202 on based on the availability of resources (e.g., memory, functional unit availability) of each processor 106. The memory allocating module 216 may determine that an instruction should be executed on the processor 106 with the most resources. The memory allocating module 216 may, instead of indicating that a single translated instruction 202 should be executed on a different processor 106, instead indicate that a group of translated instructions 202 should be executed on the different processor 106, such as a translated instruction 202 and its immediate dependent instructions (up to a certain level of instruction depth).

In the case of a processor 106 and a different type of processing unit (that is not a processor 106), the memory allocating module 216 may determine where to execute an instruction based on availability of resources, but also based on the capabilities of the processor 106 and the other processing units. Instructions that execute faster on the processor 106 may execute on the processor 106, while instructions that execute faster on the other processing units (e.g., a CPU or GPU) may execute on those units.

The memory allocating module 216 may further determine, within each processor 106, which functional unit, group of functional units, or type of functional units on which to execute a translated instruction 202. For example, certain functional units may be capable of executing only certain instructions. The memory allocating module 216 may indicate for each translated instruction 202 which functional unit, group of functional units, or type of functional unit should execute the translated instruction 202.

The memory allocating module 216 may further determine relative memory locations for where operands should be stored and loaded from. These memory locations may be selected by the memory allocating module 216 based on which functional unit is used to execute the instructions. Each functional unit may be associated with and can access a memory on the processor, and the appropriate memory is selected by the memory allocating module 216 when indicating a relative memory address for the operands of the instruction.

After ordering, timing, and distributing the translated instructions 202, the scheduler 118 outputs a set of scheduled instructions 222. These may be used directly by the assembler 122, or may be optimized via the constraint optimizer 120, as described below.

Example Constraint Optimizer

Figure 3:
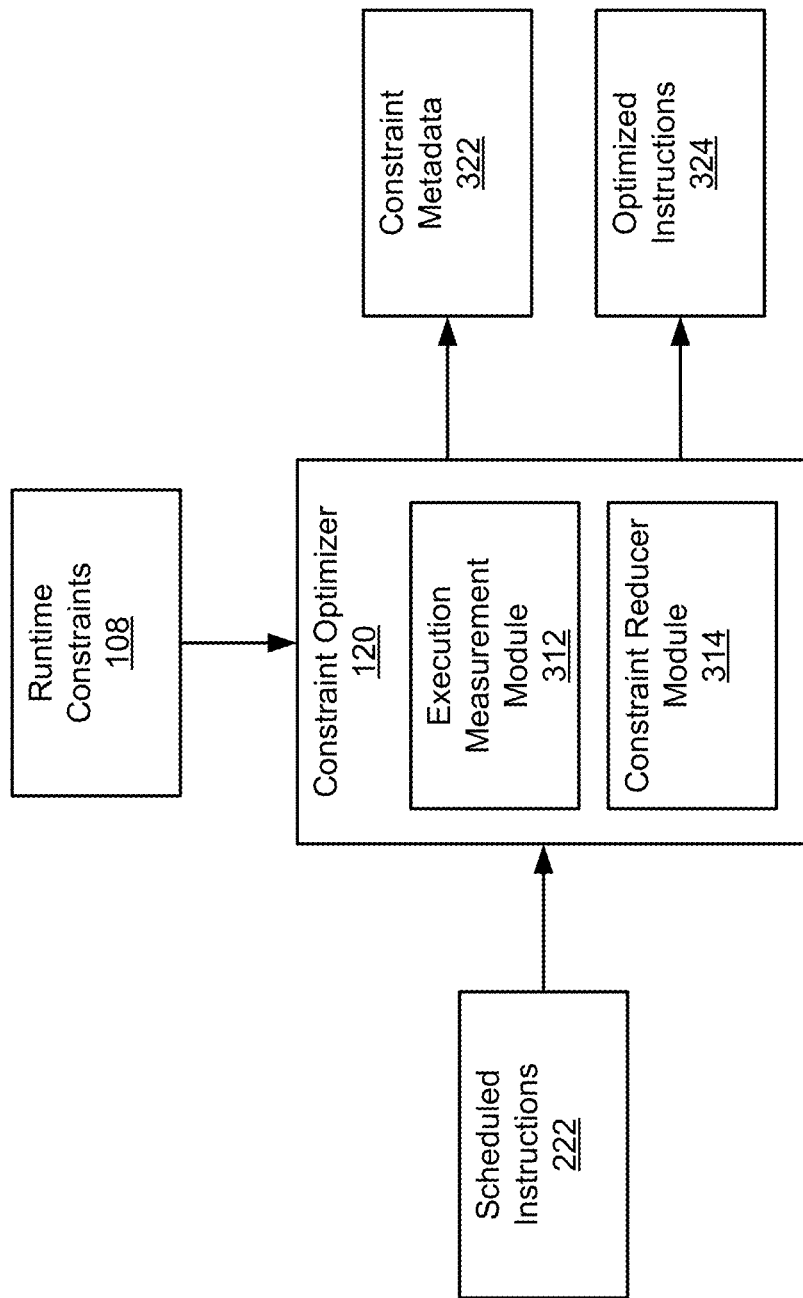
FIG. 3 illustrates a detailed block diagram of the constraint optimizer, according to an embodiment.

FIG. 3 illustrates a detailed block diagram of the constraint optimizer 120, according to an embodiment. The constraint optimizer 120, as noted, may modify the scheduled instructions 222 so that a subsequent execution of the scheduled instructions 222 meets or exceeds a set of runtime constraints 208. As illustrated, the constraint optimizer 120 includes an execution measurement module 312 and a constraint reducer module 314. Although a particular set of modules is illustrated here, in other embodiments the number, type, and/or function of the modules of the constraint optimizer 120 are different.

The execution measurement module 312 measures the existing limits for the execution of the program as presented by the scheduled instructions 222, which may otherwise be known as the existing constraints. As noted, the limits indicate various resource utilization characteristics due to executing the program (i.e., the scheduled instructions 222) on the processor 106. These resource utilization characteristics may include latency, clock cycles used, power draw (cumulative, maximum, average, etc.), memory used, data throughput, heat generated, and so on. As 1) the scheduled instructions 222 are statically scheduled and all instructions predetermined and known, as 2) the execution measurement module 312 knows the amount of resources needed to execute each instruction, and as 3) the execution measurement module 312 knows the hardware characteristics of the processor 106 and a default or desired configuration for the processor 106, thus the execution measurement module 312 can very accurately measure the existing constraints for an execution of the scheduled instructions by the processor 106 by computing the various resources used from the execution of each scheduled instruction 222 or group of scheduled instructions 222. For example, the execution measurement module 312 can compute the total power used by adding up the known power usage from the execution of each statically scheduled instruction. As another example, the execution measurement module 312 can determine the total clock cycles for the execution by adding the clock cycles needed for each instruction. As yet another example, the execution measurement module 312 can determine total execution time by counting the total (serial) clock cycles needed to generate an output from a set of inputs.

In one embodiment, after measuring the existing constraints for the scheduled instructions 222, the constraint reducer module 314 compares the existing constraints to the runtime constraints 108, which may be provided by a user or other external entity. If the existing constraints of the schedule instructions 222 are within the runtime constraints 108 (i.e., existing constraints≤runtime constraints 108), the constraint reducer module 314 may do nothing and simply outputs the scheduled instructions as the optimized instructions 324, and includes the existing constraints as the constraint metadata 322, which is also output. However, if the existing constraints are not within the runtime constraints 108 (i.e., existing constraints>runtime constraints 108), then the constraint reducer module 314 attempts to modify the scheduled instructions 222 so that the modified instructions, when executed, may conform within the runtime constraints 108.

In another embodiment, the compiler 104 receives, instead of a set of runtime constraints 108, a list of constraints with which the compiler 104 attempts to optimize the resultant compiled binary upon. In such a case, the compiler 104 attempts to minimize upon each of the constraints such that the resulting constraint value for the compiled binary is as low or high as can be achieved through a certain amount of time spent in modifying the scheduled instructions 222 for the compiled binary, or until a threshold value for the constraint after various rounds of modification of the scheduled instructions 222. The result may include multiple variations of the modified instructions which are optimized for different constraints (i.e., different performance metrics).

In one embodiment, to modify the scheduled instructions 222, the constraint reducer module 314 uses a greedy method. The constraint reducer module 314 may first take one of the existing constraints that has the largest deviation with the corresponding runtime constraint 108 (e.g., the measured power constraint of the scheduled instructions 222 has the largest difference with a power constraint in the runtime constraints 108), and performs any modifications to the scheduled instructions 222 and/or configuration options for the simulated processor 106 that are designed to lower that particular constraint. After each modification, the existing constraints for the currently modified set of scheduled instructions 222 is measured, and if the runtime constraints 108 are met, then no more changes are made in order to meet that particular runtime constraint 108. The greedy method may further be used on the constraint that previously had the second largest deviation, and so on.

In another embodiment, in order to modify the scheduled instructions 222 to meet the runtime constraints 108, the constraint reducer module 314 uses a SMT (satisfiability modulo theory) instance solver, a SAT instance solver, or uses integer linear processing. In the case of the SAT instance solver, the constraint reducer module 314 may require that some constraints of the execution of the scheduled instructions 222 to be fixed to the value of the corresponding runtime constraint 108, and then has the SAT instance solver modify the scheduled instructions 222 in order to attempt to find a solution of modified instructions that meets the fixed constraints.

The modifications in both cases above may involve modifying the ordering of the scheduled instructions 222, modifying the timing of the scheduled instructions, and modifying the distribution of the scheduled instructions 222, similar to the processes performed by the scheduler 118. As an example of a modification, certain functional units of the processor 106 may be restricted to certain types of instructions. The modifications may also include changing the configuration settings of the processor 106 (which may have various modes), such as configuration settings limiting the number of functional units in use, the amount of memory in use, memory timings, clock speed, power savings mode, etc. Different modifications may be associated with reducing certain constraints, and this correlation between modifications and constraints may be stored by the constraint reducer module 314. The constraint reducer module 314 may first attempt modifications that correlate to the reduction of the existing constraint that deviates most significantly from the corresponding runtime constraint 108. For example, the greedy method may first attempt a modification that can lower the continuous power requirements of the execution of the scheduled instructions (e.g., by increasing the delay between instructions), in order to meet a power constraint in the runtime constraints 108.

If any of the methods described above determine that a modification to the scheduled instructions 222 (with or without modification to configuration options of the processor 106) can allow an execution of the scheduled instructions 222 to meet the runtime constraints 108, the constraint reducer module 314 may output these modified scheduled instructions 222 as the optimized instructions 324, as well as indicate in an output constraint metadata 322 the finally measured constraints for the optimized instructions 324, which may differ from the runtime constraints 108, as well as any other configuration options for the processor 106. However, if any of the above methods fail to determine a set of instructions that when executed meet the runtime constraints 108, the constraint reducer module 314 may still output as the optimized instructions 324 the set of modified instructions that most closely met the runtime constraints 108 (i.e., when compared to the runtime constraints 108, the constraints of these instructions had the least amount of total deviation or weighted deviation compared to other modified instructions that were tested), as well as the constraint information for these optimized instructions 324 as the constraint metadata 322, although the constraint metadata 322 may indicate that a solution meeting the runtime constraints 108 was not met.

Example Assembler

Figure 4:
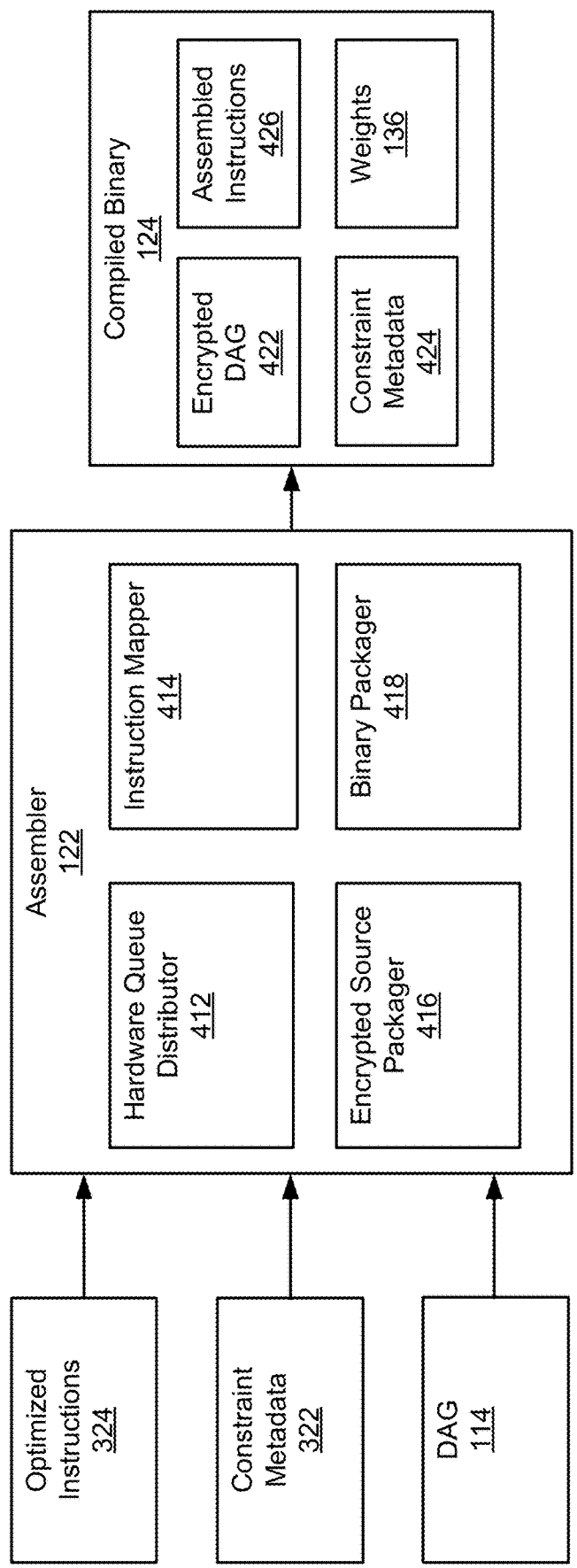
FIG. 4 illustrates a detailed block diagram of the assembler, according to an embodiment.

FIG. 4 illustrates a detailed block diagram of the assembler 122, according to an embodiment. The assembler 122, as noted, performs the final operations for converting a set of optimized instructions 324 (or scheduled instructions 222 in the case where constraint optimization is not performed) into a compiled binary 124 for execution at the processor 106. As illustrated, the assembler 122 includes a hardware queue distributor 412, an instruction mapper 414, an encrypted source packager 416, and a binary packager 418. Although a particular set of modules is illustrated here, in other embodiments the number, type, and/or function of the modules of the assembler 122 are different.

The hardware queue distributor 412 determines the individual instruction queues to assign to each of the optimized instructions 324 (or group of instructions). As each processor 106 may have multiple copies of each functional unit, and as the scheduler 118 and constraint optimizer 120 may have only determined a group or type of functional unit for each optimized instruction 324, the hardware queue distributor 412 may further refine this by determining the exact instruction queue for the exact functional unit that each optimized instruction 324 is to be sent to. The hardware queue distributor 412 may determine to which functional unit to assign an instruction based on which memory the instruction needs to access (grouping those that need access to the same memory together), or may assign instructions by some other method, such as a round robin allocation. When assigning the instructions to the individual instruction queues, the hardware queue distributor 412 ensures that the constraints for the execution of the optimized instructions 324 does not change. To ensure this, the hardware queue distributor 412 may assign instructions to queues based on specific rules which ensure that the assignment does not change the constraints when the program is executed. For example, an instruction may be assigned to a queue only when memory access latency for instructions in that queue match the previously determined memory access latency when the memory access latency was simulated by the constraint optimizer 120 for that instruction.

In another embodiment, the scheduler 118 and/or optimizer 120, through the process described above, has already distributed each instruction to a particular instruction queue (e.g., via the instruction distribution module 214), and thus the hardware queue distributor 412 is not used.

In one embodiment, the instruction mapper 414 maps the memory locations of operands in the optimized instructions 324 to actual memory locations in the specific version of the processor 106 which is the compilation target for the compiler 104. A subset of the optimized instructions 324 may load and store data from memory. For example, an example instruction may load from memory to a bus. However, these subset of the optimized instructions 324 may only include relative memory locations, or placeholder indicators of memory locations. The instruction mapper 414 modifies these optimized instructions 324 to convert these memory locations in the instructions to actual physically available memory locations in the processor 106. Each operand referencing a memory location in the instruction is assigned its own actual memory location, and the instruction mapper 414 may further keep track of allocated memory locations and those memory locations that have been deallocated due to manual deallocation, operands falling out of scope, or via a garbage collection process. Those memory locations that have been deallocated can subsequently be re-allocated by the instruction mapper 414 for new operands.

The optimized instructions 324, with the assigned queue and mapped memory locations, are stored as the assembled instructions 426.

The encrypted source packager 416, in one embodiment, packages the source for the predictive model 102, which in this case may be represented by the DAG 114, in an encrypted (and possibly compressed) DAG 422 within the compiled binary 124. Also included may be the optimized order of execution of the operators in the DAG 114 (as ordered by the scheduler 118). By including the DAG 114 within the compiled binary 124, predictive model 102 can easily be recompiled for new versions of the processor 106 without having to perform the entire process of compilation again. Instead, because the DAG 114 includes the ordered instructions for the predictive model 102, the compilation may occur in linear time, and may only require minor translation of the instructions to the newer versions, and reassignment to new queues and mapping to new memory locations, as performed, for example, by the hardware queue distributor 412 and the instruction mapper 414. As the DAG 114 is encrypted, a decryption key is needed to view the DAG 114 and discover how it functions. However, the decryption key may be stored on the processor 106 and is not transmitted outside the processor 106. Instead, the processor 106 may directly decrypt the DAG 114 on-chip for the purposes of re-compilation. This allows the DAG 114 to stay secured.

The binary packager 418 packages the assembled instructions 426, the constraint metadata 424, the weights 136 for the predictive model 102, and the aforementioned encrypted DAG 422 into the compiled binary 124. In some cases, an encrypted version of the original predictive model 102 is also packaged. The assembled instructions 426 are executed on the processor 106, and each instruction may include a count field indicating an amount of delay associated with the instruction. The encrypted DAG 422, as noted above, allows for faster recompilation for new or different versions of the processor 106 hardware. The constraint metadata 424 may indicate the original runtime constraints 108 as well as the constraints for the current set of assembled instructions 426. This allows the compiler 104, if it receives a request to re-compile the compiled binary 124 for a new hardware version, to re-compile the compiled binary to once again meet the same runtime constraints 108, as they are stored within the binary. The weights 136 are also stored with the compiled binary 124 by the binary packager 418. These weights 136 may also be encrypted, and are needed for proper execution of the predictive model 102, as described previously.

In one embodiment, the binary packager 418 may fuse two different predictive models together based on their DAGs 114. If enough is known about each predictive model, then the models may be combined together into a larger model, which, for example, may take the output of one model as input into another model. The binary packager 418 may combine the assembled instructions 426 for multiple models together and link their outputs to their inputs, as well as add the constraints for each individual model together to determine the constraints of the larger model. For example, in the case of a self-driving car, the predictive models may include a detection model, a classification model, and a prediction model. These may be combined together into a single model of detection=>classification=>prediction.

In one embodiment, the binary packager 418 may allow two different sets of assembled instructions 426 to share the same weights 136. These different sets of assembled instructions 426 are created based on different runtime constraints 108. For example, a first set of assembled instructions may have been created to meet a lower power constraint, vs a second set of assembled instructions that may have been created to meet a lower execution time constraint (i.e., lower number of clock cycles to execute) relative to the first set of assembled instructions. However, both set of instructions share the same weights for the predictive model 102, as both set of assembled instructions are generated from the same predictive model 102. In such a case, the binary packager 418 may link the compiled binary with the second set of assembled instructions to the weights stored in the compiled binary of the first set of assembled instructions (or vice versa). Alternatively, the binary packager 418 may package the weights separately in a separate binary or file, and link both compiled binaries, each with a different set of assembled instructions, to the package with the weights. When loading these compiled binaries with shared weights onto the processor 106, both the weights and the compiled binary are loaded onto the processor 106, and the processor 106 loads the weights according to the link indicated in the compiled binary. These different versions of the compiled binaries may be generated automatically by the compiler 104 by modifying one or more runtime constraints 108 specified by a user. For example, the runtime constraints for power usage, and time (e.g., clock cycles) spent may be modified by the compiler 104 to generate different compiled versions of the same predictive model 102 that meet these different modified constraints.

In one embodiment, the compiler 104 transmits a report with information or displays the information to the user or other entity that made the request for the compilation request for the predictive model 102, or to an entity that requests such a report for any compiled binary 124. This information may include the constraint metadata 424 for the compiled binary 124. As noted, the constraint metadata 424 indicates the constraints (i.e., resource characteristics) under which the compiled binary 124 will fall under when executed by the processor 106. Thus, for example, the compiler 104 may present a report to the user indicating that the compiled binary 124 will run within a particular power envelope, for a particular number of clock cycles or time. This allows the user to understand the resource requirements for the compiled binary 124, and to request further optimization of the binary via the constraint optimizer 120, to modify the predictive model 102 in order to compile a new binary, and so on. These constraints may be based on the previously submitted runtime constraints 108 for the compilation of the predictive model 102, or in the case where runtime constraints 108 are not provided, indicate the existing constraints for the assembled instructions 426 as measured by the compiler 104 (with, e.g., the execution measurement module 312). An example of such a report that is generated by the compiler 104 is illustrated in FIG. 7 and described in further detail below.

Example Processor

Figure 5:
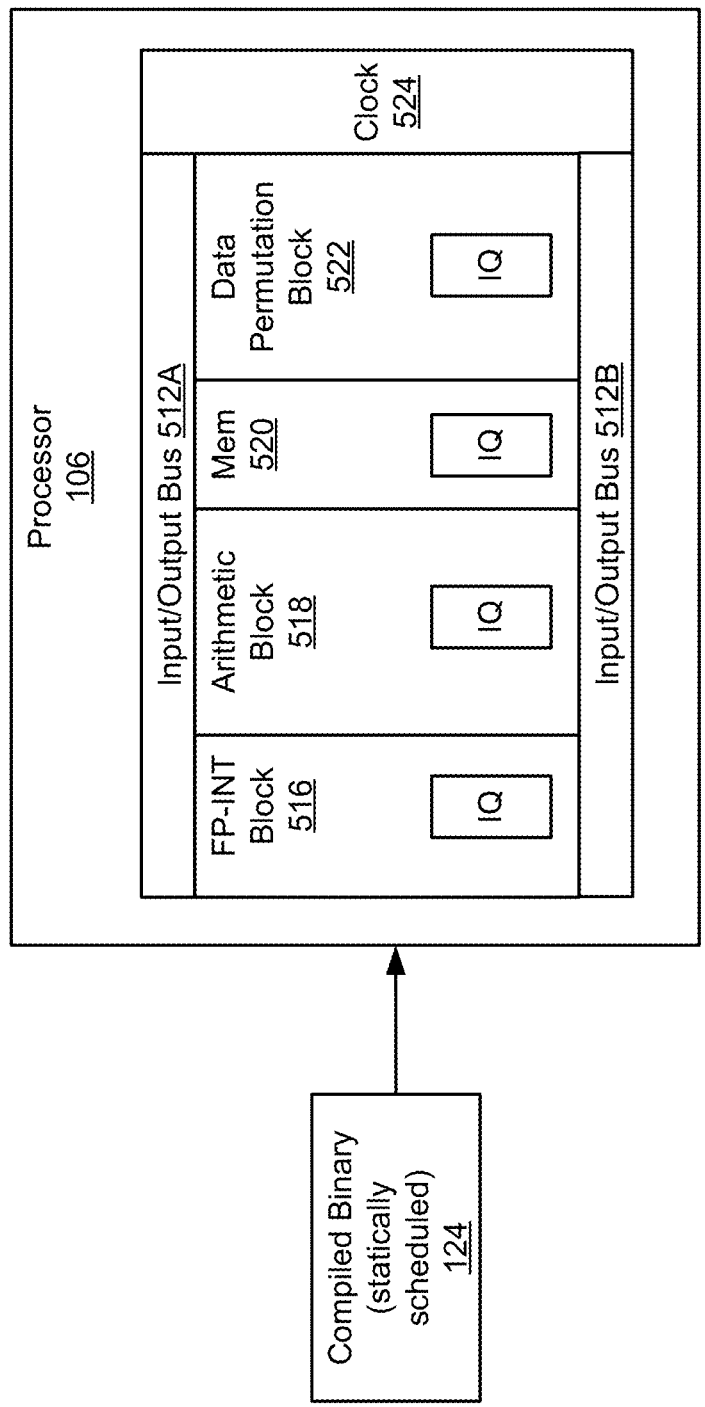
FIG. 5 illustrates a detailed block diagram of the processor, according to an embodiment.

FIG. 5 illustrates a detailed block diagram of the processor 106, according to an embodiment. The processor 106, as noted, executes a statically scheduled set of instructions compiled from a predictive model 102 by the compiler 104. As illustrated, the processor 106 includes an input/output bus 512A-B, a FP-INT block 516, an arithmetic block 518, a memory 520, a data permutation block 522, and a clock generator 524. Although a particular set of component blocks is illustrated here, in other embodiments the number, type, and/or function of the component blocks of the processor 106 are different. In particular, in practice, the processor 106 may have many more of the individual functional units illustrated herein.

The input/output (I/O) bus 512 provides input and output for the functional unit blocks of the processor 106. The FP-INT block 516 may perform floating point to integer conversions, and vice versa. The arithmetic block 518 may perform various matrix and other mathematical operations as indicated by the compiled binary 124. The memory 520 may store operands as indicated by the compiled binary 124, along with other data, e.g., the program data, counters, etc. The data permutation block 522 may perform various other data manipulation operations. The clock 524 provides a clock signal for the processor 106, or for sub-sections of the processor 106. Although not shown, each functional unit in the processor 106 includes an instruction queue.

Each functional unit block (514, 516, 518, 520, and 522) has its own dedicated instruction queue (IQ). The assignment of specific instructions to specific instruction queues is done by the compiler 104 when generating the binary 124. The instructions in each queue are executed in a deterministic manner without branching. The delay between the execution of one instruction and the execution of the next instruction is set by the delay value in the next instruction. As a result, the instructions execute in the processor 106 in a completely predictable manner.

As noted, because the compiler 104 generates a statically scheduled set of instructions in the compiled binary 124 (e.g., each instruction may include NOPs as previously described), the timing and execution of each instruction in the compiled binary 124 by the processor 106 is predetermined and known by the compiler 104. Thus, the compiler 104 can, due to this static scheduling, be able to measure the constraints (i.e., resource characteristics) of a set of instructions in a compiled binary 124, and further determine whether the constraints meet a set of runtime constraints 108. When a user or other operator utilizes the processor 106 to execute the compiled binary 124, that user or operator is guaranteed due to the method in which the compiled binary is compiled that its execution by the processor 106 will conform within the constraints indicated in the compiled binary, e.g., in the constraint metadata 322.

In some embodiments, the compiled binary 124 is stored in the memory 520 of the processor 106 itself.

In one embodiment, two or more compiled binaries, such as the compiled binary 124, may be loaded onto the processor 106. The processor 106 may be able to dynamically switch between each of these different compiled binaries during execution. This may be achieved by swapping out the assembled instructions of one compiled binary from memory and loading the assembled instructions from another binary, or by switching a pointer or other program instruction indicator in the processor 106 from the first set of assembled instructions for the first compiled binary, to the second set of assembled instructions for the second compiled binary.

Additionally, as described previously, each of the compiled binaries may be compiled from the same predictive model 102, and thus generate the same output, but be compiled based on different runtime constraints 108. In such a case, the processor 106 may switch between either of these different compiled binaries during execution. Each binary may be configured with various checkpoints or indicators specifying a point in execution (i.e., a point within the list of assembled instructions for each of the binaries) where the execution will have reached an identical state, such that the state of the operands/tensors is the same for both compiled binaries at that point (i.e., this is a point of data coherency). Alternatively, the processor may be able to automatically identify such points based on previous executions of both compiled binaries using the same data. Once any of these checkpoints are reached, the processor 106 may switch to the other compiled binary, but continue executing upon the same data stored in memory. This allows the processor 106 to switch between different compiled binaries that have different runtime constraints 108 while continuing to execute upon the same data. The processor 106 may be configured to optimize based on certain global runtime constraints, unless not possible to do so. In these cases, the processor will chose the compiled binary that has runtime constraints 108 that most closely matches these global runtime constraints, and execute this chosen compiled binary until a context switch condition is met. This context switch condition indicates that the processor 106 should attempt to optimize based on a different set of global runtime constraints. As an example, the processor 106 may execute a first compiled binary based on a predictive model which runs with tight (i.e., low) power constraints but with relatively longer time, based on a global constraint that minimizes power use (i.e., constraints max power). However, once a context switch condition, such as a maximum execution time, or an execution queue size threshold (i.e., threshold value for number of compiled binaries awaiting execution) is met, then the processor 106 may switch to a different set of global constraints. For example, an alternative global constraint may minimize time of execution. Faced with this switched global constraint, the processor 106 may determine that a second compiled binary based on the same predictive model should be executed because it has relatively tighter time constraints (i.e., it's runtime constraint 108 indicated a relatively shorter amount of execution time), which is less than or closer in value to the alternative global constraint. As noted, the switchover may occur at a checkpoint in the compiled binary.

Example Directed Acyclic Graph

Figure 6:
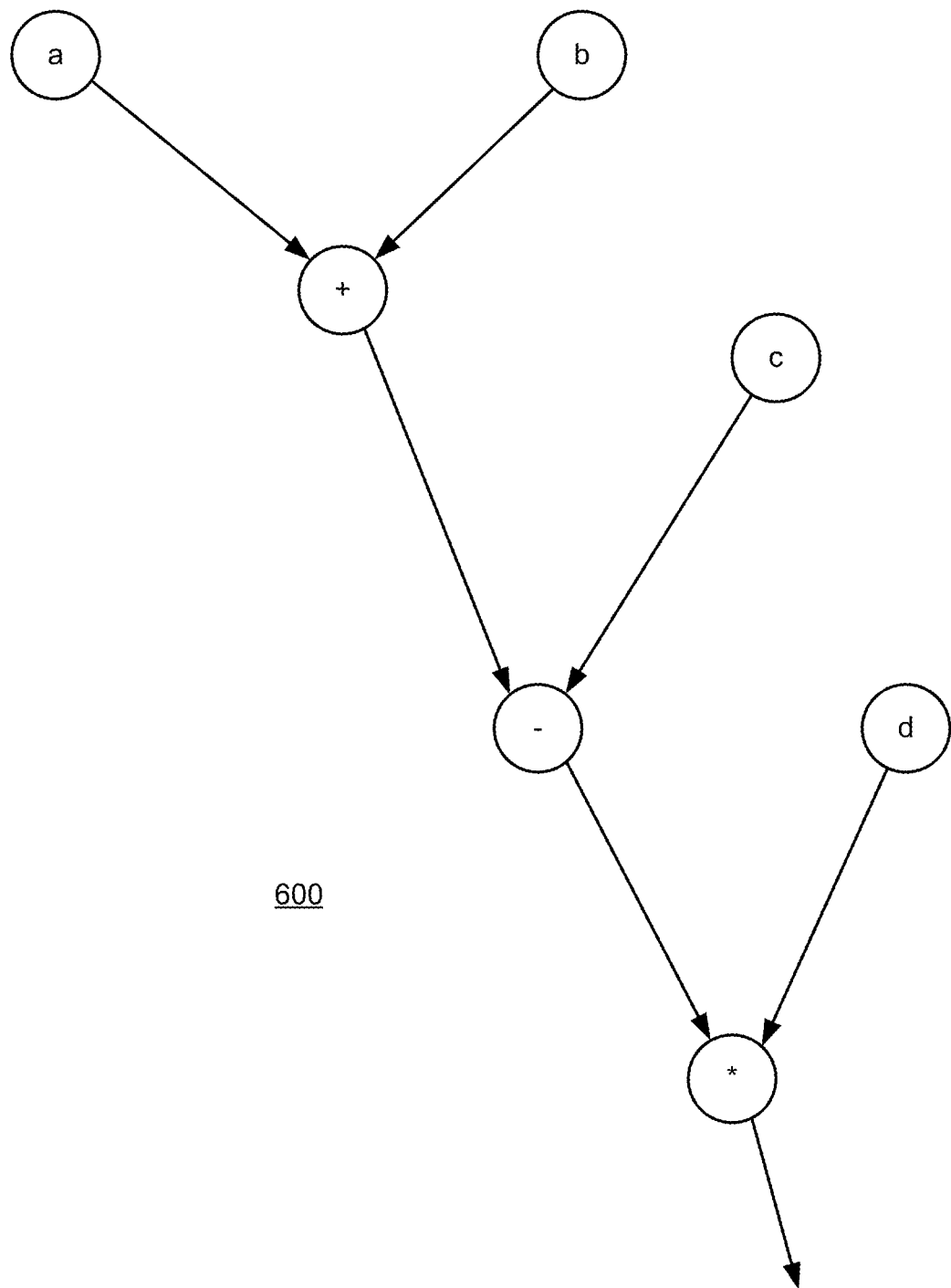
FIG. 6 illustrates a portion of an example of a directed acyclic graph (DAG) that may be generated by the DAG generator, according to an embodiment.

FIG. 6 illustrates a portion of an example 600 of a directed acyclic graph (DAG) 114 that may be generated by the DAG generator 112, according to an embodiment. Although a particular configuration is shown here, it is for the purposes of presentation only and should not be construed to imply that a particular visual structure is needed for the DAG 114 or that the configuration of the example DAG 600 as shown is the only possible configuration.

In the illustrated example 600, the vertices "a" and "b" represent a set of initial inputs for this example. In practice, the number of vertices in a DAG 114 may be much greater, with the values and operators being more advanced than the simple arithmetic shown here for sake of clarity. The vertices "a" and "b" are directed towards the vertex "+" indicating that the values represented by "a" and "b" are to be added, and this output is directed to the vertex "−". Also directed to the vertex "−" is the vertex "c". Note that this indicates that the vertex "−", which describes a subtraction operator, is dependent upon the output from the vertex "+", as the output from the vertex "+" is an operand for the operator at vertex "-d". The output from the subtraction of the output from the vertex "+" and the vertex "c" servers as input (an operand) to the vertex "*", as does the value represented by the vertex "d". Note that the vertex "*" is dependent both on the vertex "−" and the vertex "+". Thus, if this exemplary DAG 600 represented a predictive model 102, then during compilation of the predictive model by the compiler 104, the operator and instructions associated with the vertex "*" may be ordered after the operators and instructions associated with the vertices "−" and "+", upon which the operator and instructions associated with the vertex "*" depend. While the ordering solution for this exemplary DAG 600 is trivial, the ordering solution for a DAG 114 in practice is more complicated owing to the large number of vertices in play.

Example Constraints Report

FIG. 7 illustrates an example of a report 700 of constraint metadata for a compiled binary as reported by the compiler 104, according to an embodiment. Although a particular format for the report is shown here, in other embodiments, the amount of information, format, and order of the information differs. Furthermore, although specific command line parameters and instructions are shown, these may not completely represent the actual command line parameters and may be simplified or renamed for purposes of explanation.

In the example report 700, a "compile" command is executed on a predictive model named "resnet152.model" to load the compiler 104 to compile the "resnet152" predictive model. This model file may be a binary file representing a predictive model, such as the predictive model 102, and may include the various nodes 132 and tensors 134 of the predictive model 102. Furthermore, the command line parameters for the compile command include options to compile to optimize for different constraints (i.e., runtime characteristics), such as throughput (e.g., data throughput), latency, energy (e.g., power used), and memory usage. This optimization process may occur, for example, in the constraint optimizer 120 as described above.

After optimizing for these various constraints, the compiler 104 produces a report (e.g., via the assembler 122) which indicates, for each of the different constraint optimized versions of the assembled instructions 426, the constraints metadata 424 for each. As optimizing for one constraint may negatively impact other constraints (i.e., other performance metrics), each of the versions of the assembled instructions 426 may have the constraint to be optimized be of a minimal (i.e., more desirable) value while the other constraints that were not optimized may be of a higher (i.e., less desirable) value. In the illustrated example, the constraints that are reported for the different versions of the assembled instructions 426 are IPS (instructions per second, i.e., throughput), duration (time spent for execution), peak-memory (max amount of memory used), and energy (energy used in computation). These constraints are displayed for the four different versions of the assembled instructions 426: 1) throughput optimized, 2) latency optimized, 3) energy optimized, and 4) memory optimized. These correspond to optimizing the constraints for 1) high IPS, 2) low duration, 3) low energy, and 4) low peak memory, respectively. As noted previously, this constraints metadata 424 is stored with the assembled instructions 426 in the compiled binary 124, and indicates the expected constraints for the assembled instructions 426 if executed, while also allowing for the compiler to attempt a recompilation of the assembled instructions 426 (using the encrypted DAG 422) to also fall under the same constraints. Furthermore, as noted previously, the weights 136 for the assembled instructions 426 are stored separately, allowing each version of the assembled instructions 426 to utilize the same weights.

Example Flow

Figure 8:
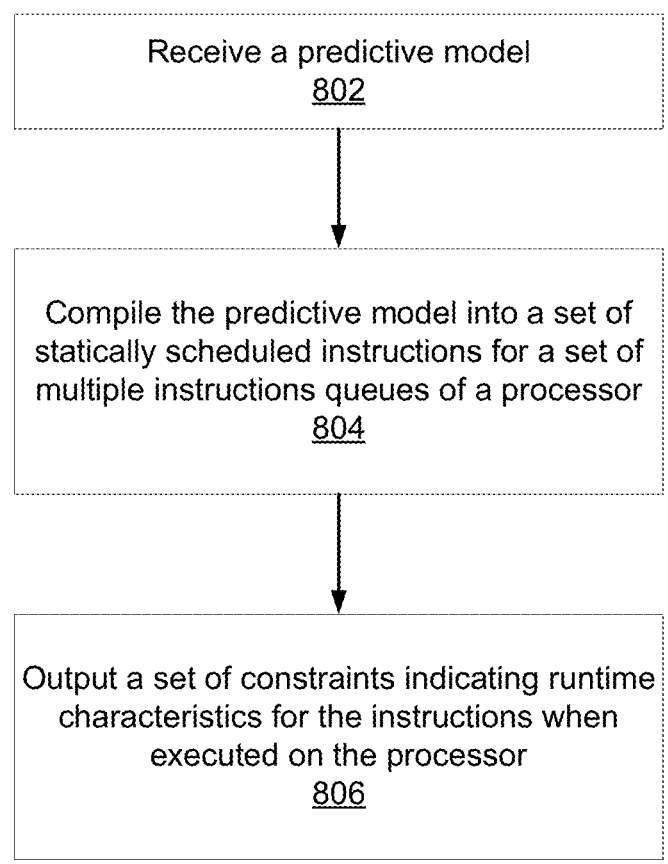
FIG. 8 illustrates a flow chart for the compilation of a predictive model to a statically scheduled compiled binary, according to an embodiment.

FIG. 8 illustrates a flow chart for the compilation of a predictive model 106 to a statically scheduled compiled binary, according to an embodiment. In one embodiment, the process described here may be performed by the compiler 104, or more accurately a processor executing stored instructions that correspond to the software instructions for the compiler 104. While a particular order is shown here, in other embodiments the steps in the flow chart may be performed in a different order.

Initially, the processor executing the stored instructions corresponding to the compiler 104 receives 802 a predictive model 102 (and in some cases a set of runtime constraints 108). The predictive model, as noted includes nodes and tensors.

The same processor further compiles 804 the predictive model 102 into a set of statically scheduled instructions for a set of multiple instructions queues of a processor 106. This statically scheduled set of instructions is stored in the compiled binary 124. In some cases, the execution of the instructions by the processor is designed to conform within the runtime constraints. To perform the compilation, the processor may first rewrite the operators of the predictive model into translated instructions, schedule the instructions in an optimal fashion, and map and assemble the instructions into a set of compiled machine instructions in the compiled binary 124.

The same processor further outputs 806 a set of constraints indicating runtime characteristics for the instructions when executed on the processor 106. These constraints may be displayed in a report, such as the report 700.

Example Machine Architecture

Figure 9:
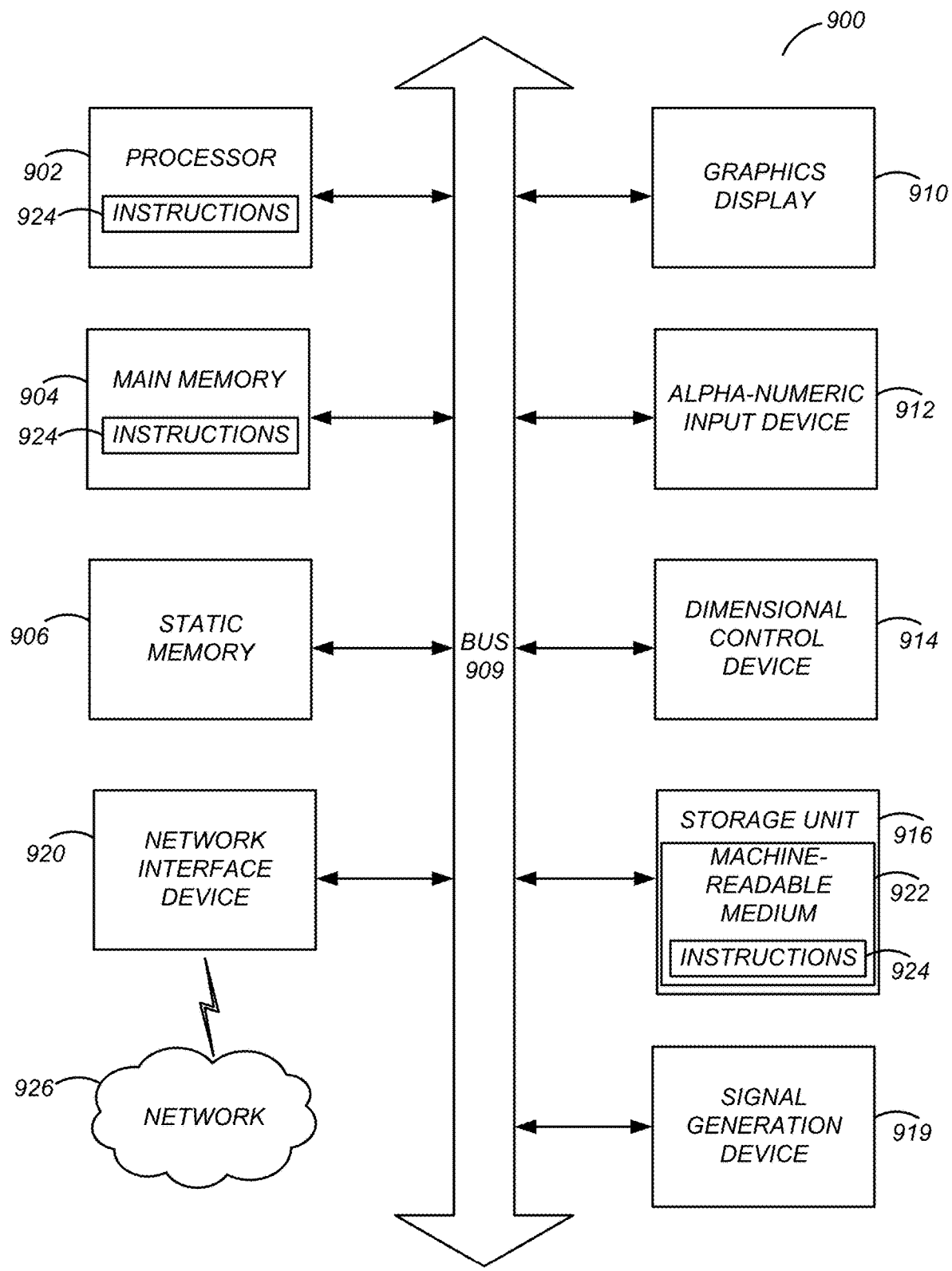
FIG. 9 is a block diagram illustrating components of an example machine able to read instructions from a machine-readable medium and execute them in one or more processors, according to an embodiment

FIG. 9 is a block diagram illustrating components of an example machine able to read instructions from a machine-readable medium and execute them in one or more processors (or controllers), according to an embodiment. Portions, or all, of the example machine described in FIG. 9 can be used with the components described above with reference to FIGS. 1-8. For example, the example machine may be used to execute the compiler 104. Additionally, the example machine may be used as a separate processing unit used to execute some of the instructions of the predictive model 102.

In FIG. 9 there is a diagrammatic representation of a machine in the example form of a computer system 900. The computer system 900 can be used to execute instructions 924 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The architecture described may be applicable to other computer systems that operate in the system 100, such as a server computer, a client computer, a personal computer (PC), a tablet PC, a smartphone, an internet of things (IoT) appliance, a network router, switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processing units (generally processor 902). The processor 902 is, for example, a central processing unit (CPU), a graphics processing unit (GPU), a digital signal processor (DSP), a controller, a state machine, one or more application specific integrated circuits (ASICs), one or more radiofrequency integrated circuits (RFICs), or any combination of these. The computer system 900 also includes a main memory 904. The computer system may include a storage unit 916. The processor 902, memory 904 and the storage unit 916 communicate via a bus 908.

In addition, the computer system 906 can include a static memory 906, a display driver 910 (e.g., to drive a plasma display panel (PDP), a liquid crystal display (LCD), or a projector). The computer system 900 may also include input/output devices, e.g., an alphanumeric input device 912 (e.g., a keyboard), a dimensional (e.g., 2-D or 3-D) control device 914 (e.g., a mouse, a trackball, a joystick, a motion sensor, or other pointing instrument), a signal generation device 918 (e.g., a speaker), and a network interface device 920, which also are configured to communicate via the bus 908.

The storage unit 916 includes a machine-readable medium 922 on which is stored instructions 924 (e.g., software) embodying any one or more of the methodologies or functions described herein. The instructions 924 may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 may be transmitted or received over a network 926 via the network interface device 920.

While machine-readable medium 922 is shown in an example embodiment to be a single medium, the term "machine-readable medium" should be taken to include a single medium or multiple media (e.g., a centralized or distributed database, or associated caches and servers) able to store the instructions 924. The term "machine-readable medium" shall also be taken to include any medium that is capable of storing instructions 924 for execution by the machine and that cause the machine to perform any one or more of the methodologies disclosed herein. The term "machine-readable medium" includes, but not be limited to, data repositories in the form of solid-state memories, optical media, and magnetic media.

ADDITIONAL CONSIDERATIONS

The disclosed configuration beneficially allows for the creation of a compiled binary for a machine learning model in which the runtime constraints of the compiled binary are known before execution.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-7. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 802, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This description should be read to include one or at least one and the singular also includes the plural unless it is obvious that it is meant otherwise.

Upon reading this disclosure, those of skill in the art will appreciate still additional alternative structural and functional designs for a system and a process for compiling a statically scheduled binary for a predictive model. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined.

What is claimed is:

1. A system, comprising:
a compiler configured to:
determine each functional unit of a plurality of functional units in a processor to execute a respective instruction of a plurality of instructions,
select a corresponding memory location for one or more operands of the respective instruction based on the each determined functional unit, the corresponding memory location selected to reduce a latency of streaming the one or more operands from the corresponding memory location to the each determined functional unit, the corresponding memory location indicating a physical memory address within a memory unit associated with the each determined functional unit, and
compile the plurality of instructions into a binary, the binary including a respective indication of the corresponding memory location from which to load the one or more operands and store one or more results of the respective instruction; and
the processor configured to execute the binary.

2. The system of claim 1, wherein the compiler is further configured to select the corresponding memory location such that a threshold value for power consumption of the processor is not exceeded when the respective instruction is executed by the each determined functional unit.

3. The system of claim 1, wherein the compiler is further configured to select the corresponding memory location such that a combination of a first threshold value for power consumption of the processor and a second threshold value for the latency is not exceeded when the respective instruction is executed by the each determined functional unit.

4. The system of claim 1, wherein the compiler is further configured to select the corresponding memory location based on a position of the corresponding memory location in the processor relative to a position of the each determined functional unit in the processor.

5. The system of claim 1, wherein the compiler is further configured to select the corresponding memory location based on an availability of resources of the processor.

6. The system of claim 1, wherein the compiler is further configured to select the corresponding memory location based on an availability of the each functional unit for execution of the respective instruction.

7. The system of claim 1, wherein the compiler is further configured to select the corresponding memory location based on a capability of the each functional unit to execute the respective instruction.

8. The system of claim 1, wherein the each determined functional unit is a vector computation unit, a matrix arithmetic unit, or a numerical conversion unit.

9. The system of claim 1, wherein the compiler is further configured to compile the plurality of instructions into a plurality of binaries, the processor executing a selected binary of the plurality of binaries based on a corresponding runtime constraint.

10. A non-transitory computer-readable storage medium comprising stored computer executable instructions, the instructions which when executed by a compiler operating on at least one computer processor cause the at least one computer processor to:
determine each functional unit of a plurality of functional units in a processor to execute a respective instruction of a plurality of instructions;
select a corresponding memory location for one or more operands of the respective instruction based on the each determined functional unit, the corresponding memory location selected to reduce a latency of streaming the one or more operands from the corresponding memory location to the each determined functional unit, the corresponding memory location indicating a physical memory address within a memory unit associated with the each determined functional unit; and compile the plurality of instructions into a binary, the binary including a respective indication of the corresponding memory location from which to load the one or more operands and store one or more results of the respective instruction.

11. The non-transitory computer-readable storage medium of claim 10, wherein the instructions further cause the at least one computer processor to select the corresponding memory location such that a threshold value for power consumption of the processor is not exceeded when the respective instruction is executed by the each determined functional unit.

12. The non-transitory computer-readable storage medium of claim 10, wherein the instructions further cause the at least one computer processor to select the corresponding memory location such that a combination of a first threshold value for power consumption of the processor and a second threshold value for the latency is not exceeded when the respective instruction is executed by the each determined functional unit.

13. The non-transitory computer-readable storage medium of claim 10, wherein the instructions further cause the at least one computer processor to select the corresponding memory location based on a position of the corresponding memory location in the processor relative to a position of the each determined functional unit in the processor.

14. The non-transitory computer-readable storage medium of claim 10, wherein the instructions further cause the at least one computer processor to select the corresponding memory location based on an availability of resources of the processor.

15. The non-transitory computer-readable storage medium of claim 10, wherein the instructions further cause the at least one computer processor to select the corresponding memory location based on a capability of the each functional unit to execute the respective instruction.

16. The non-transitory computer-readable storage medium of claim 10, wherein the instructions further cause the at least one computer processor to compile the plurality of instructions into a plurality of binaries, the processor executing a selected binary of the plurality of binaries based on a corresponding runtime constraint.

17. A method, comprising:
determining, by a compiler, each functional unit of a plurality of functional units in a processor to execute a respective instruction of a plurality of instructions;
selecting, by the compiler, a corresponding memory location for one or more operands of the respective instruction based on the each determined functional unit, the corresponding memory location selected to reduce a latency of streaming the one or more operands from the corresponding memory location to the each determined functional unit, the corresponding memory location indicating a physical memory address within a memory unit associated with the each determined functional unit; and
compiling, by the compiler, the plurality of instructions into a binary, the binary including a respective indication of the corresponding memory location from which to load the one or more operands and store one or more results of the respective instruction.

18. The method of claim 17, further comprising:
selecting, by the compiler, the corresponding memory location such that a threshold value for power consumption of the processor is not exceeded when the respective instruction is executed by the each determined functional unit.

19. The method of claim 17, further comprising:
selecting, by the compiler, the corresponding memory location such that a combination of a first threshold value for power consumption of the processor and a second threshold value for the latency is not exceeded when the respective instruction is executed by the each determined functional unit.

20. The method of claim 17, further comprising:
selecting, by the compiler, the corresponding memory location based on a position of the corresponding memory location in the processor relative to a position of the each determined functional unit in the processor.

* * * * *